United States Patent
Schulakow-Klass et al.

(10) Patent No.: US 12,492,866 B2
(45) Date of Patent: Dec. 9, 2025

(54) GRATE BAR FOR A PELLETIZING OR SINTERING MACHINE

(71) Applicants: PAUL WURTH S.A., Luxembourg (LU); PAUL WURTH DEUTSCHLAND GMBH, Wiesbaden (DE)

(72) Inventors: Andrej Schulakow-Klass, Wiesbaden (DE); Mirko Müller, Bad Nauheim (DE); Georg Strüber, Frisange (LU)

(73) Assignees: PAUL WURTH S.A., Luxembourg (LU); PAUL WURTH DEUTSCHLAND GMBH, Wiesbaden (DE)

(*) Notice: Subject to any disclaimer, the term of this patent is extended or adjusted under 35 U.S.C. 154(b) by 538 days.

(21) Appl. No.: 17/998,083

(22) PCT Filed: May 5, 2021

(86) PCT No.: PCT/EP2021/061887
§ 371 (c)(1),
(2) Date: Nov. 7, 2022

(87) PCT Pub. No.: WO2021/224339
PCT Pub. Date: Nov. 11, 2021

(65) Prior Publication Data
US 2023/0228490 A1     Jul. 20, 2023

(30) Foreign Application Priority Data
May 7, 2020  (EP) ..................... 20173517

(51) Int. Cl.
*F27D 3/12*  (2006.01)
*F27D 3/00*  (2006.01)

(52) U.S. Cl.
CPC ...... *F27D 3/123* (2013.01); *F27D 2003/0061* (2013.01)

(58) Field of Classification Search
CPC .... F27D 3/123; F27D 2003/0061; F27D 3/12; F27B 21/02
(Continued)

(56) References Cited

U.S. PATENT DOCUMENTS 1,704,027 A * 3/1929 Thomas ............... F27B 21/06
                                                266/279
2,949,289 A   8/1960 Werner
(Continued)

FOREIGN PATENT DOCUMENTS

CN    202719872 U   2/2013
CN    111089487 A   5/2020
(Continued)

OTHER PUBLICATIONS

SE540930, Grating rod for a Grating Wagon at a Sintering Machine and Grating Wagon, Dec. 27, 2018 (Year: 2018).*
(Continued)

*Primary Examiner* — Jessee R Roe
*Assistant Examiner* — Michael Aboagye
(74) *Attorney, Agent, or Firm* — CANTOR COLBURN LLP

(57) ABSTRACT

A grate bar for mounting in arrays of adjacent grate bars in a pallet car of a sintering or pelletizing machine includes an elongate crossbeam extending in a longitudinal direction of a horizontal plane, with a middle section between two opposite end sections. The crossbeam has a generally rectangular cross-section with an upper surface for receiving bulk material thereon, an opposite lower surface, and peripheral surfaces for facing adjacent grate bars. The crossbeam has two legs to vertically secure the grate bar to the pallet
(Continued)

car. The end sections of the crossbeam include first interlocking components shaped and arranged such that they cooperate with first interlocking components of grate bars of a neighbouring row of grate bars; thereby limiting relative translations of two neighbouring grate bars in at least a vertical and a horizontal orientation. The first interlocking means components have a triangular cross-section in a horizontal plane.

17 Claims, 3 Drawing Sheets

(58) Field of Classification Search
USPC ........ 266/279, 277, 178, 180, 274; 432/137, 432/241
See application file for complete search history.

(56) References Cited

U.S. PATENT DOCUMENTS

| | | | | |
|---|---|---|---|---|
| 3,759,369 | A | * | 9/1973 | Vering ................. B65G 17/007 |
| | | | | 266/178 |
| 6,217,318 | B1 | * | 4/2001 | De Giovanni Pache De Faria ..... |
| | | | | F23H 17/12 |
| | | | | 432/137 |
| 10,260,812 | B2 | * | 4/2019 | Gonzalez ................ F27B 21/02 |
| 2017/0016672 | A1 | | 1/2017 | Gonzalez et al. |

FOREIGN PATENT DOCUMENTS

| | | | | |
|---|---|---|---|---|
| KR | 20030053625 | * | 7/2003 | ............. F27B 21/02 |
| SE | 1551587 | A1 | 6/2017 | |
| SE | 1700073 | A1 | 10/2017 | |
| SE | 540930 | * | 12/2018 | ............. F27B 21/02 |
| SU | 851064 | A1 | 7/1981 | |

OTHER PUBLICATIONS

KR20030053625, Choi et al., Grate Bar for Developing Permeability in a Sintering Machine, Jul. 2, 2003 (Year: 2003).*
International Preliminary Report on Patentability re: Application No. PCT/EP2021/061887, issued Jul. 27, 2022, pp. 1-6.
International Search Report issued Jun. 11, 2021 re: Application No. PCT/EP2021/061887, pp. 1-4, citing: SE 1 551 587 A1, US 2017/0016672 A1, SE 1 700 073 A1, CN 111 089 487 A, SU 851 064 A1 and CN 202 719 872 U.
Written Opinion issued Jun. 11, 2021 re: Application No. PCT/EP2021/061887, pp. 1-7, citing: SE 1 551 587 A1, US 2017/0016672 A1, SE 1 700 073 A1, CN 111 089 487 A, SU 851 064 A1 and CN 202 719 872 U.

* cited by examiner

GRATE BAR FOR A PELLETIZING OR SINTERING MACHINE

TECHNICAL FIELD

The present disclosure generally relates to a device used in a sintering or pelletizing machine, and more particularly to a grate bar for mounting in arrays of adjacent grate bars on a pallet car of a sintering or pelletizing machine.

BACKGROUND

In sintering or pelletizing machines, bulk material to be treated, for example iron ore, is charged onto a travelling grate comprising an endless chain of pallet cars. The pallet cars filled with the bulk material are driven through various treatment stations for thermally treating the material, which is thereafter discharged from the machine as heat-treated product.

After the treatment stations, the pallet cars are turned over to discharge the heat-treated product lying on the grates by gravity and the cars are guided upside down back to the beginning of the treatment stations of the sintering or pelletizing machine, where they are turned over again, ready to receive bulk material thereon. The sintering or pelletizing machine thus operates in a cycle as an endless grate carriage chain.

The top of the pallet cars comprises a grate on which bulk material is charged. During one thermal treatment, heating of the bulk material is achieved by blowing a flow of hot gas either upwards or downwards through the bulk material and the grate of the pallet car. The grate therefore generally comprises a plurality of grate bars separated by gaps to allow the flow of gas therethrough. The grate bars are arranged parallel to each other in rows and columns so as to cover the entire charging surface of the pallet car. A grate bar typically comprises a main supporting crossbeam for receiving the bulk material thereon. The crossbeam further comprises connection means, generally in the form of tongue and groove design, to secure the grate bar to a frame element of the pallet car.

The individual grate bars are generally loosely arranged on the pallet car, one beside the other, so as to maintain a degree of movement. Such an arrangement allows the grate to self-clean. Indeed, the movement of the grate bars with respect to each other when the pallet cars are turned upside down allows for bulk material stuck between two neighbouring grate bars to loosen and fall off the grate. Connection means between the grate bars and the pallet cars are configured in a tongue and groove design at each end of the grate bar, to prevent the grate bars from falling out when the pallet cars are turned over.

Due to the high thermal variations inside the sintering or pelletizing machine, the connection between the grate bars and the pallet car generally comprises an expansion space, in all three directions, allowing thermal expansion of the grate bars.

Since the pallet cars are subject to very harsh thermal conditions inside the machine, pallet cars undergo substantial mechanical wear, particularly caused by the highly abrasive surface of the bulk material. As a result, the grate bars must regularly be replaced.

Typical signs of wear on grate bars show a decreasing volume of the top crossbeam due to the impact of the material combined with high temperature and airflow. The grate bar eventually loses its initial shape and the predetermined gap between grate bars is no longer maintained.

In use, particles of sinter or pellets get stuck in the gaps between grate bars and tend to push one grate bar toward a neighbouring grate bar. The grate bars thus lose their parallel positioning and become tilted relative to one another. As a consequence, the gaps between the grate bars comprise wider and tighter areas. In the wider areas, more and bigger particles may get stuck, thus increasing the abrasion phenomenon and reducing the lifetime of the grate bars and of the pallet car in general. In tighter areas, there is no space left to permit thermal expansion of the grate bar, thereby reducing its robustness and provoking material damage. Additionally, the negative effect from bulk material falling through the gaps between grate bars can have an impact on downstream equipment, such as e.g. windboxes, ducts, fans and sealings.

When the pallet car is turned upside down, grate bars loosely connected to the pallet car move vertically relative to the car. Then, at the beginning of the line, the pallet car is turned back to its regular position with the grate bars falling down into their functional places. Nonetheless, bulk particles or any spillage stuck in spaces between the grate bars may disturb the correct vertical positioning of the grate bars. Some grate bars may not lay down properly and remain protruding from the otherwise generally plane surface of the grate carriage. The thereby formed irregular top surface of the pallet car increases localized wear due to abrasive effects. The vertically misaligned grate bars further interfere with the cleaning process of the upper surface of the pallet car arrangement.

Though the loose connection between the grate bars and the pallet car allows easy replacement operations of the grate bars, these operations are cost and time consuming. There is therefore a need for improving the durability of the grate bars.

Solutions are known in the art in order to reduce wear of the grate bars. For example, U.S. Pat. No. 1,704,027 discloses a grate for sintering plants. The grate comprises a plurality of grate bars connected to a grate carriage. In this example, the grate bars are equipped with transversal spacers in their transversal direction in order to maintain a gap between neighbouring grate bars. The grate bars are connected to one another by a longitudinal overlapping end. This overlapping end limits movements of the bars during the turning over of the pallet car in order to have a better weight distribution and prevent the grate bars from rocking the pallet car prematurely until it has been rotated to a predetermined position. Once passed the predetermined rotating position, the grate bars will move with considerable force to more effectively break up and dislodge any material that may clog the spaces between grate bars.

This solution limits clogging of the gaps between the grate bars and attempts to prevent the height differences when the pallet car comes back to its original position. Nevertheless, there is no solution to avoid a lateral or longitudinal misalignment of the grate bars or to slow down the wear of the grate bars.

Another solution is suggested in U.S. Pat. No. 2,949,289 A, which discloses a grate bar for a sintering or pelletizing machine, wherein the grate bar cleanses itself of material lodged between the grate and the pallet car frame. The end of the grate bar comprises a wedge shape to push away sinter particles. As the pallet car is turned back to its original position, the grate bars move back down to their support element on the pallet car, pushing away any particles below the end of the grate bars to ensure that the grate bars do not get stuck in a higher vertical position.

In the latter solution, there is again means to improve the vertical positioning of the grate bar, but there is still a risk of horizontal misalignment leading to increased wear of the grate bars.

SUMMARY

It is therefore desirable to provide a solution to improve the durability of a grate bar, in particular to reduce the increased wear caused by misalignments of the grate bars on a pallet car.

The disclosure overcomes the above discussed deficiencies and disadvantages by providing a grate bar for a pallet car of a sintering or pelletizing machine. The grate bar is preferably mounted in arrays of adjacent grate bars on the pallet car. The grate bar comprises an elongate crossbeam extending in a longitudinal direction of a horizontal plane, with a middle section between two opposite end sections.

The crossbeam has a generally rectangular cross-section with a support surface for receiving bulk material thereon, an opposite base surface, and peripheral surfaces for contacting adjacent grate bars. The crossbeam further comprises two legs to vertically secure the grate bar to the pallet car. Each leg may have a hook shape with a vertical branch essentially perpendicular to the lower surface, and a horizontal branch essentially parallel to the lower surface and extending outwardly.

According to the disclosure, the end sections of the crossbeam comprise first interlocking means, the latter being shaped and arranged such that the first interlocking means cooperate with first interlocking means of grate bars of a neighbouring row of grate bars; thereby limiting relative translations of two neighbouring grate bars in at least a vertical and a horizontal orientation. The first interlocking means has a triangular cross-section in a horizontal plane.

Due to the triangular shape of the first interlocking means, the end sections of the grate bars of one row of grate bars engage with the end sections of the grate bars of a neighbouring row of grate bars. This not only limits individual grate bars in their movement in the longitudinal and transversal direction of the grate bar, but also in their rotational movement. Indeed, the grate bars are prevented from tilting or canting. Thus, the predefined gap between neighbouring grate bars is essentially maintained. Undesired localised gap increases between neighbouring grate bars can be avoided.

In the context of the disclosure, the term orientation is used to refer to a global orientation that may be represented by a line in the three-dimensional space. The term direction will then refer to one of the two directions possibly pointed by an orientation.

In the context of the disclosure, the horizontal plane is parallel to the surface formed by the array of grate bars on which bulk material is received, and hence parallel to the plane of the pallet car of a sintering or pelletizing machine. A horizontal direction is thus comprised within the horizontal plane and includes the longitudinal direction and transversal direction.

The first interlocking means preferably limits the translation of the grate bar in both directions of the horizontal orientation. The position of the first interlocking means in the end section of the grate bar allows for a gap to be provided between two adjacent grate bars in the middle section. This gap forms a gas passage allowing a gas stream to flow through the grate.

Preferably, the triangular cross-section of the first interlocking means has an apex, which is located on a medial line between two side surfaces of the crossbeam. Such a medial line is parallel to the two side surfaces and arranged to be half-way between the two side surfaces. The medial line extends beyond the crossbeam in the longitudinal direction. With the apex lying on such a medial line, the shape of the triangular cross-section is that of an equilateral or isosceles triangle. Thus, the first interlocking means is a V-shaped first interlocking element. It is however not excluded to provide a first interlocking means wherein the apex is not on such a medial line, thereby providing a first interlocking means having a shape corresponding to an acute triangle or even right triangle. The opposite end of the neighbouring grate bar then has its first interlocking element of a complementary shape.

Preferably, the peripheral surfaces of the middle section of the grate bar respectively comprise at least one spacer extending in a transversal direction. While it is not excluded to provide more than one spacer on the longitudinal side surfaces, the grate bars are however advantageously provided with a single spacer in the centre of the middle section.

The spacers are arranged such that two spacers of neighbouring grate bars come into contact with each other, thereby defining the distance between the crossbeams, i.e. the gap between grate bars through which gas is blown. The spacers are advantageously positioned and dimensioned to define, in use, a gap between neighbouring crossbeams forming a gas passage for an incoming gas flow of blown gas. Such a spacer thus defines a constant gap between two adjacent grate bars, in order to maintain the air flow through an array of grate bars, while avoiding particles of material from falling though the grate. The spacer is preferably arranged in an upper region of the crossbeam because this section is exposed to major wear. During the lifetime of the grate bar, this upper part and the spacer will be reduced in width. However, due to the overlapping of the end sections of the grate bars, between neighbouring rows, the grate bars can be readjusted to maintain the desired gap through which gas is blown.

The spacer may be of any appropriate shape. Preferably, however, the spacer has a shape narrowing in direction of the incoming gas flow. Such a spacer may e.g. be triangular or half-circular, with their pointy side or rounded side facing upwards for machines in which gas is blown through the grate bars from above or downwards for machines in which gas is blown through the grate bars from below.

Further interlocking means may be provided to secure a grate bar relative to an adjacent grate bar. Such further interlocking means may comprise one or more interlocking elements. When two adjacent grate bars move vertically, for example due to the turning of the pallet car, the overlapping of the interlocking means ensures that there is no vertical misalignment of the grate bars. As they overlap in at least a vertical and a horizontal orientation, most of the grate bar misalignments are avoided.

Preferably, the interlocking means is configured to overlap with an interlocking means of a neighbouring grate bar in the longitudinal orientation of the grate bar row.

According to an embodiment of the disclosure, the grate bar is provided with second interlocking means, which may comprise a first protrusion and a corresponding second protrusion arranged to overlap a first protrusion of a neighbouring grate bar. The first and second protrusions protrude on the end sections of the crossbeam in a transversal direction. The first and second protrusions are positions in such a way that, when two grate bars are positioned in a grate, the one side of the first protrusion of one grate bar faces one side of the second protrusion of the other grate bar. The first and second protrusions thereby form an abutment between each other in the longitudinal direction of the grate bar, thereby limiting movement of the grate bars in the longitudinal direction.

The first and second protrusions may be of rectangular cross-section. Alternatively, the first and second protrusions may be of triangular cross-section. In the latter case, the protrusions may be arranged so as to not only limiting movement of the grate bars in the longitudinal direction, but also in the vertical direction.

According to an embodiment of the disclosure, the grate bar is provided with third interlocking means on the longitudinal sides of the legs of the grate bar.

In one embodiment, the third interlocking means may comprise an upper lip on one side of a leg and a lower lip on the other side of the leg; the upper and lower lips being dimensioned and positioned in a staggered arrangement such that, in use, an upper lip of one grate bar cooperate with a lower lip of a neighbouring grate bar form an abutment in a vertical, height direction of the grate bar. The upper and lower lips are preferably arranged on the horizontal branch of the leg.

In another embodiment, the third interlocking means may comprise a first U-shaped lip arranged on one side of the grate bar and a second U-shaped lip arranged on the other side of the grate bar. Each U-shaped lip extends over the horizontal branch of the leg, over the vertical branch of the leg and over an end portion of the crossbeam. The second U-shaped lip has a shape corresponding to that of the first U-shaped lip but offset such that, in use, a first U-shaped lip of one grate bar cooperates with a second U-shaped lip of a neighbouring grate bar to form an abutment in a vertical, height direction and in the longitudinal direction of the grate bar.

Preferably, the upper surface of the crossbeam has concave or convex form depending on what type of machine the grate bar is used in.

Indeed, in pelletizing machines, it has been found that most wear occurs to the end sections of the crossbeam. The grate bars for use in pelletizing machines are therefore advantageously provided with a convex upper surface to increase the amount of bulk material on the end sections of the crossbeam, thereby better protecting the latter against wear.

In sinter machines, on the other hand, most wear occurs to the middle section of the crossbeam. The grate bars for use in sinter machines are therefore advantageously provided with a concave upper surface to increase the amount of bulk material in the centre of the crossbeam, thereby better protecting the middle section is against wear.

The cross-section of the crossbeam may, in the middle section thereof, be narrowing in direction of the lower surface. Such a narrowing middle section not only reduces the weight of the grate bar, but also helps to guide the gas flow to or from the region under the grate bar.

The grate bar according to the present disclosure may further comprise a stiffening rib arranged on the lower surface of the crossbeam, extending between the two legs, and preferably extending further down the inner sides of the legs. Such a stiffening rib can increase the robustness of the grate bar and thus further extend its lifetime. A recess may be arranged in the centre of the middle section to further reduce weight of the grate bar.

According to another aspect, the disclosure concerns an array of grate bars as recited in the claims.

According to yet another aspect, the disclosure concerns a pallet car of a sintering or pelletizing machine, the pallet car comprising a grate with plurality of arrays of adjacent grate bars creating a plane surface for receiving bulk material thereon, the grate bars being grate bars as described above.

BRIEF DESCRIPTION OF THE DRAWINGS

Further details and advantages of the present disclosure will be apparent from the following detailed description of not limiting embodiments with reference to the attached drawings, wherein.

DETAILED DESCRIPTION OF THE DRAWINGS

Preferred embodiments showing non limiting examples of the grate bar according to the disclosure will now be described with reference to FIGS. 1 to 6. It is understood that features that are not described in detail in one embodiment can be considered similar to the feature of previous embodiments. Also, in order not to overload the figures, some reference signs denoting identical features have not been repeated on all figures.

In the description below, the terms "top, bottom, above, below, vertical, horizontal" will be used with reference to the direction in the figures for ease of explanation. The (horizontal) longitudinal direction L, the (horizontal) transversal direction T and the (vertical) height direction H are indicated on the figures.

The grate bar is adapted to be mounted in arrays of adjacent grate bars on a frame element of a pallet car, not shown, and used in a sintering or pelletizing machine. In the following description of the grate bar, the interaction between neighbouring grate bars in an array will be mentioned to clarify the functions of the features.

Figure 1:
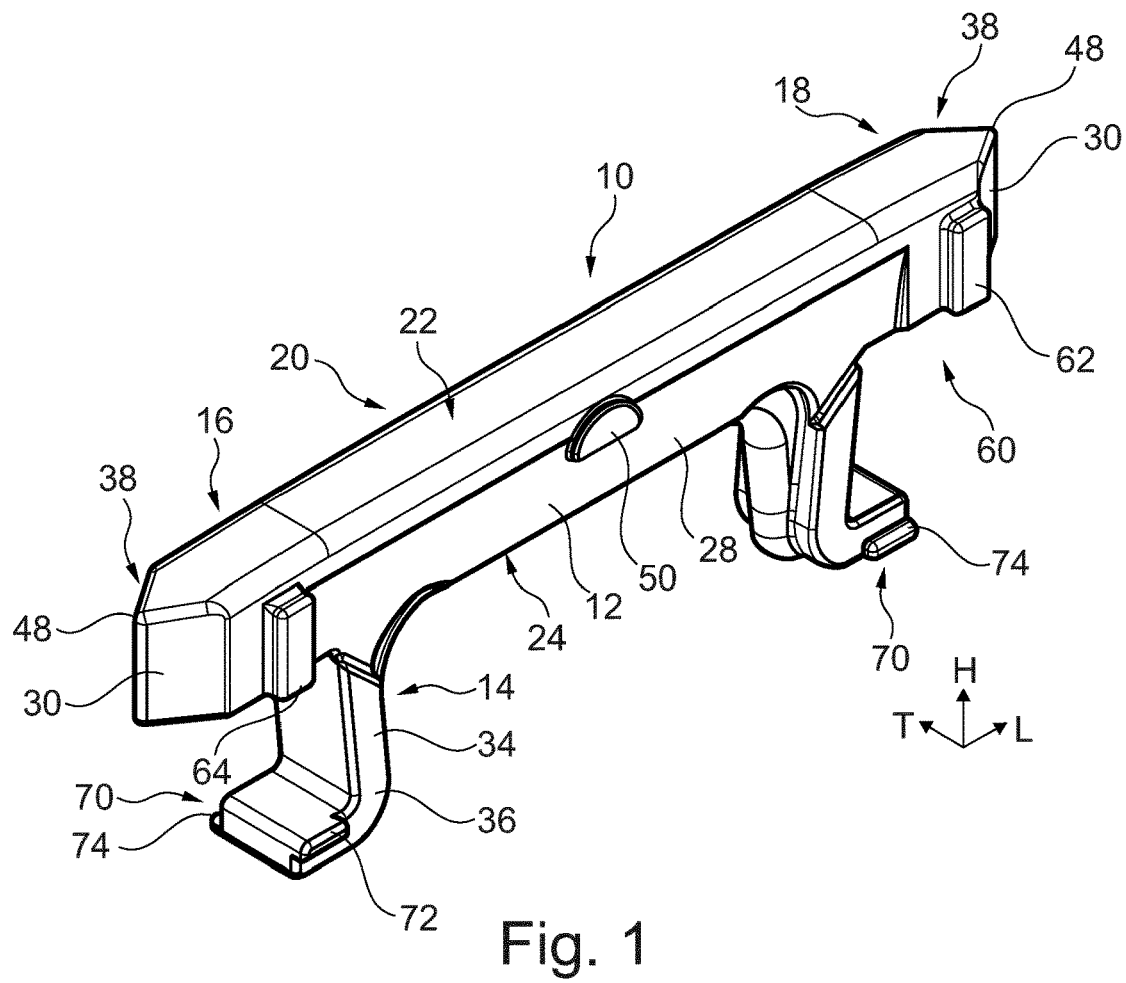
FIG. 1 is a perspective view of a first preferred embodiment of a grate bar according to the disclosure.
Figure 2:
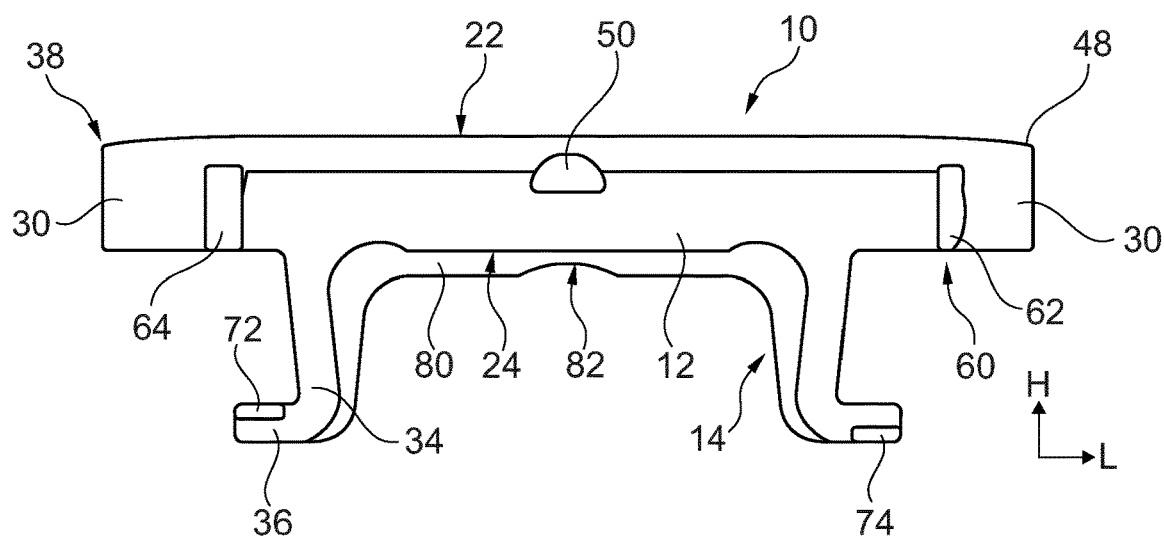
FIG. 2 is a side view of the grate bar of FIG. 1.
Figure 3:
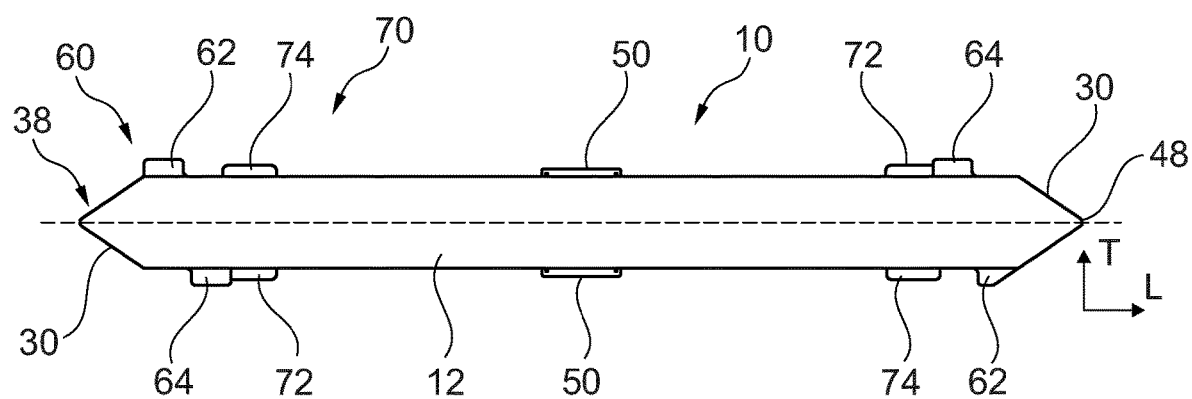
FIG. 3 is a top view of the grate bar of FIG. 1.

FIGS. 1 to 3 shows a grate bar 10 according to one embodiment, the grate bar 10 having an elongate crossbeam 12 extending in a longitudinal direction of a horizontal plane, and legs 14 attached to the crossbeam 12 to vertically secure the bar 10 to a frame of the pallet car (not shown). The grate bar 10 is virtually divided into three sections, a first end section 16, a second end section 18 opposite the first end section 16 and a middle section 20 between the two end sections 16, 18.

The crossbeam 12 extends from the first end section 16, via the middle section 20, to the second end section 18 and has a generally rectangular cross-section. It comprises an upper surface 22 for receiving bulk material thereon, and an opposite lower surface 24 that is, in use, in contact with the frame of the pallet car. The crossbeam 12 also comprises peripheral surfaces joining the upper and lower surfaces 22, 24. The peripheral surfaces are, in use, facing adjacent grate bars. The peripheral surfaces comprise two longitudinal side surfaces 28 and, at each tip of the end sections 16, 18, two transversal end surfaces 30.

In an array of grate bars, the peripheral side surfaces 28, particularly in the middle section of the crossbeam, define a fluid passage for a flow of gas between two adjacent grate bars; i.e. through the grate.

The legs 14 are attached to the lower surface 24 at each end section 16, 18, and have a hook shape with a vertical branch 34 essentially perpendicular to the lower surface 24, and a horizontal branch 36 essentially parallel to the lower surface 24 and extending outwardly.

In use, the grate bar 10 is mounted on the pallet car, with a frame element of the pallet car interposed between the lower surface 24 in each end section 16, 18 and the horizontal branch 36 of the leg 14 of the grate bar 10, thereby limiting the translation of the grate bar 10 in a vertical direction.

The skilled person will understand that when the pallet car enters the sintering or pelletizing machine and carries bulk material through thermal treatment stations, the grate bar is supported on the pallet car by having its lower surface at the end sections resting on the frame of the pallet car. When the pallet car is turned over, the grate bar lifts off the frame through gravity. The grate bar is prevented from dropping off the pallet car by means of locking bars engaging the horizontal branches 36 of the legs 14.

As shown in FIGS. 1 to 3, the end sections 16, 18 of the crossbeam 12 comprise first interlocking means 38 configured to be in overlapping contact with first interlocking means 38 of a neighbouring grate bar, thereby limiting relative translations of two neighbouring grate bars in any horizontal direction. Indeed, the grate bar is then prevented from moving in a longitudinal direction L and in a transversal direction T. The first interlocking means 38 also limits the rotational movement of the grate bars 10 in the plane of the array, i.e. the horizontal plane.

Figure 4:
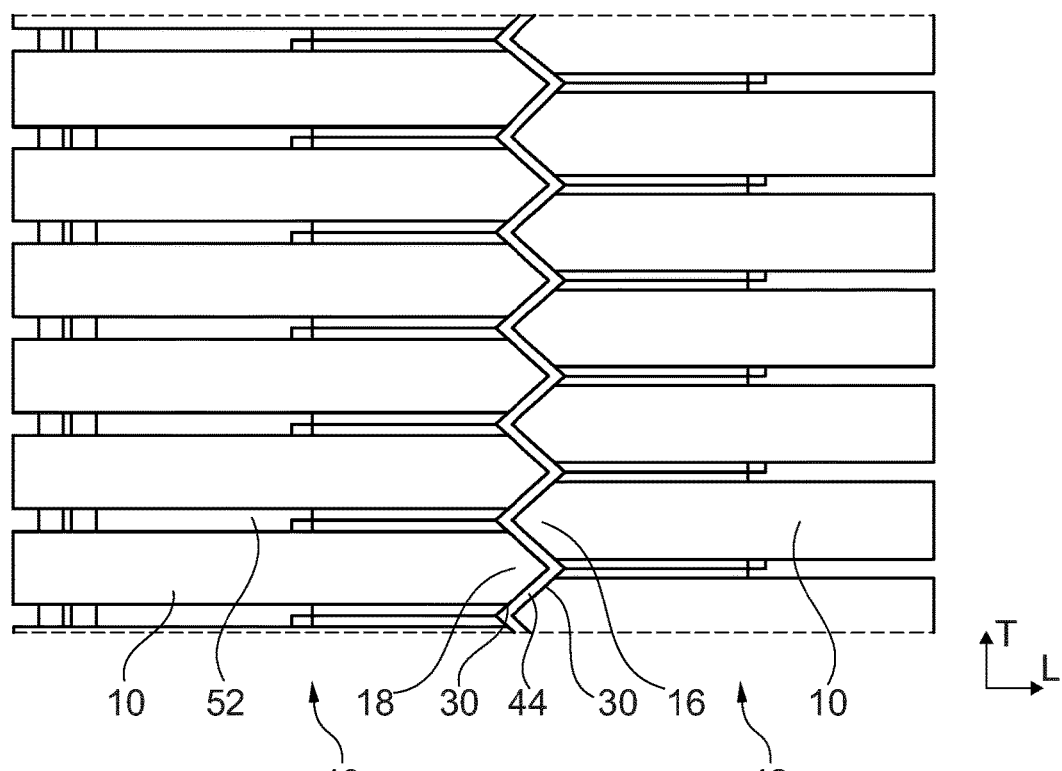
FIG. 4 is a top view of an arrangement of grate bars of FIG. 1.

FIG. 4 shows a view from above onto an array of grate bars 10 as arranged on a pallet car. This shows a first row 40 of grate bars 10 and a second row 42 of grate bars 10. The transversal end surfaces 30 of the second end section 18 of the grate bars 10 of the first row 40 engage with the transversal end surfaces 30 of the first end section 16 of the grate bars 10 of the second row 42. A gap 44 is arranged between neighbouring grate bars 10 to allow thermal expansion of the grate bars 10 in a longitudinal and transverse direction L, T.

In the embodiment shown in FIG. 4 (also FIGS. 1-3), the first interlocking elements 38 have triangular shape, with the apex 48 of the triangle being located on the medial line M between the two parallel side surfaces 28, thereby forming an equilateral or isosceles triangle (V-shaped first interlocking element). The grate bars 10 of two neighbouring rows 40, 42 of grate bars are thus arranged, as shown in FIG. 4, in a staggered configuration. It will be understood, however, that the first interlocking elements 38 can also have a triangular shape representing an acute triangle or even right triangle. The opposite end of the neighbouring grate bar 10 of course needs its first interlocking element to be of complementary shape.

Referring back to FIGS. 1 to 3, the grate bar 10 further comprises a spacer 50 arranged on each of the longitudinal side surfaces 28 of the crossbeam 12. The spacers 50 are provided in the centre of the middle section 20 and extend in a transversal direction T of the grate bar 10. The spacers 50 are arranged such that two spacers 50 of neighbouring grate bars 10 come into contact with each other, thereby defining the distance between the crossbeams 12, i.e. the gas passage 52 between grate bars through which gas is blown.

The spacer 50 may be of any appropriate shape, such as e.g. rectangular, triangular, circular or, as shown in FIGS. 1 to 3, half-circular. The rounded edge of the spacer 50 faces the incoming stream of gas, offering less resistance to the stream of gas blown through the grate bars. In machines where gas is blown through the grate bars from above, the rounded edge of the spacer 50 faces upwards as shown in FIGS. 1 to 3. In machines where gas is blown through the grate bars from below, the rounded edge of the spacer 50 will of course face downwards.

Preferably, each longitudinal side surface 28 comprises a single spacer 50. However, it is not excluded to provide more than one spacer on the longitudinal side surfaces 28.

The spacers 50 improve the parallelism of two adjacent grate bars and ensure that the gas passage 52 (as seen on FIG. 4) defined by the gap between the crossbeams 12, remains of essentially constant width. The spacers 50 divide the gas passage 52 in two smaller passages.

The grate bar 10 further comprises second interlocking means 60 on the longitudinal side surfaces 28 near the end sections 16, 18. The second interlocking means 60 comprise a first protrusion 62 protruding from the side surfaces 28 of the second end section 18 of the crossbeam 12, positioned at a predefined distance from the end surface 30. Its corresponding second interlocking element 60 is formed by a second protrusion 64 on the opposite side surface 28 of the crossbeam 12 in the second end section 18. The second protrusion 64 is positioned at an increased distance from the end surface 30 as the first protrusion 62. A corresponding arrangement of first and second protrusions 62, 64 is provided at the first end section 16.

As the grate bar 10 is disposed in an array of grate bars, the protrusions 62, 64 are arranged in close proximity to protrusions 64, 62 a neighbouring grate bar. The protrusions 62, 64 thus form an abutment between each other in the longitudinal direction L, in order to avoid misalignments of the grate bars.

Figure 5:
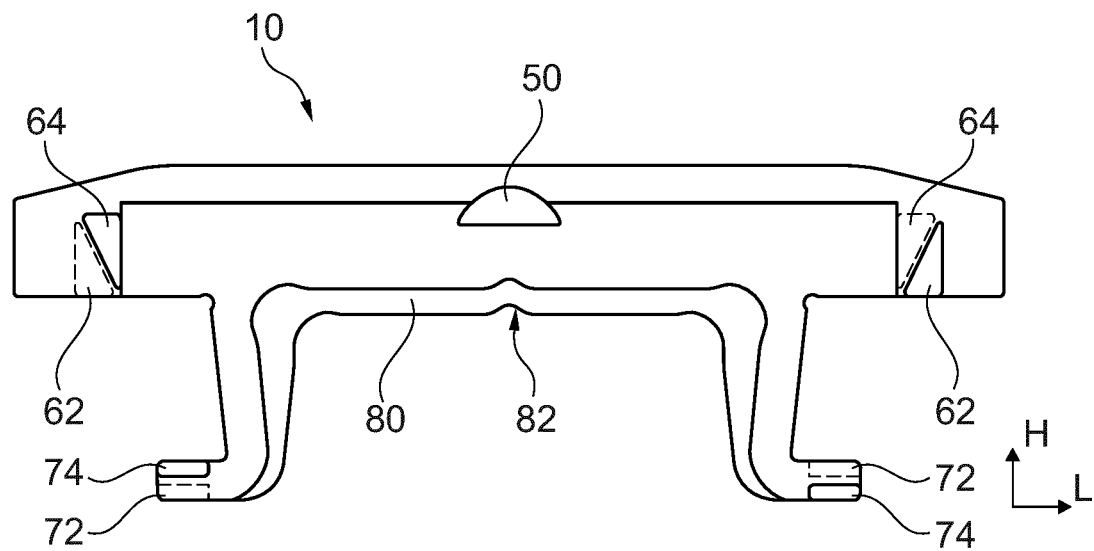
FIG. 5 is a side view of a second preferred embodiment of a grate bar according to the disclosure.

While FIGS. 1 to 3 show protrusions 62, 64 with a rectangular shape, it is also possible to provide other shapes. Triangular protrusions, as shown in FIG. 5, may e.g. be arranged such that the protrusions not only form an abutment in the longitudinal direction L, but also in the vertical height direction H. The triangular protrusions shown in dotted outline are located on the other side of the grate bar and are represented here to show their cooperation with the triangular protrusions of a neighbouring grate bar.

The grate bar 10 further comprises third interlocking means 70 on the longitudinal sides of the legs 14 of the grate bar 10. On one of the longitudinal sides, the third interlocking means is formed by a horizontal upper lip 72 on the horizontal branch 36 of the leg 14. On the other longitudinal side, the third interlocking means is formed by a horizontal lower lip 74 on the horizontal branch 36 of the leg 14. The lower lip 74 is arranged at a lower position than the upper lip 72 and positioned longitudinally, such that, as the grate bar 10 is disposed in an array of grate bars, the upper and lower lips 72, 74 form an abutment for each other in the vertical height direction H. To further improve the robustness of the overlapping connections between adjacent grate bars, the position of the upper and lower lips 72, 74 are inverted on the other leg of the grate bar.

As can further be seen from FIG. 1, the middle section 20 of the crossbeam 12 may have a cross-section narrowing down towards the lower surface 24. This allows reducing the weight of the grate bar 10 and guiding the gas flow to or from the region under the grate bar.

Also, a stiffening rib 80 is arranged on the lower surface 24 of the crossbeam 12. The stiffening rib 80 extends between the two legs 14 and down the inner sides of the legs 14. Such a stiffening rib 80 improves the rigidity of the grate bar 10 with limited quantity of material. In the centre of the middle section 20, the stiffening rib 80 comprises a recess 82, which further reduces material weight. The recess 82 also helps reduce stress peaks in critical areas of the grate bar 10. The recess 82 may be an enlarged rounded section as shown in FIG. 2. Alternatively, the recess 82 may be a smaller, pointier area as e.g. shown in FIG. 5.

Figure 6:
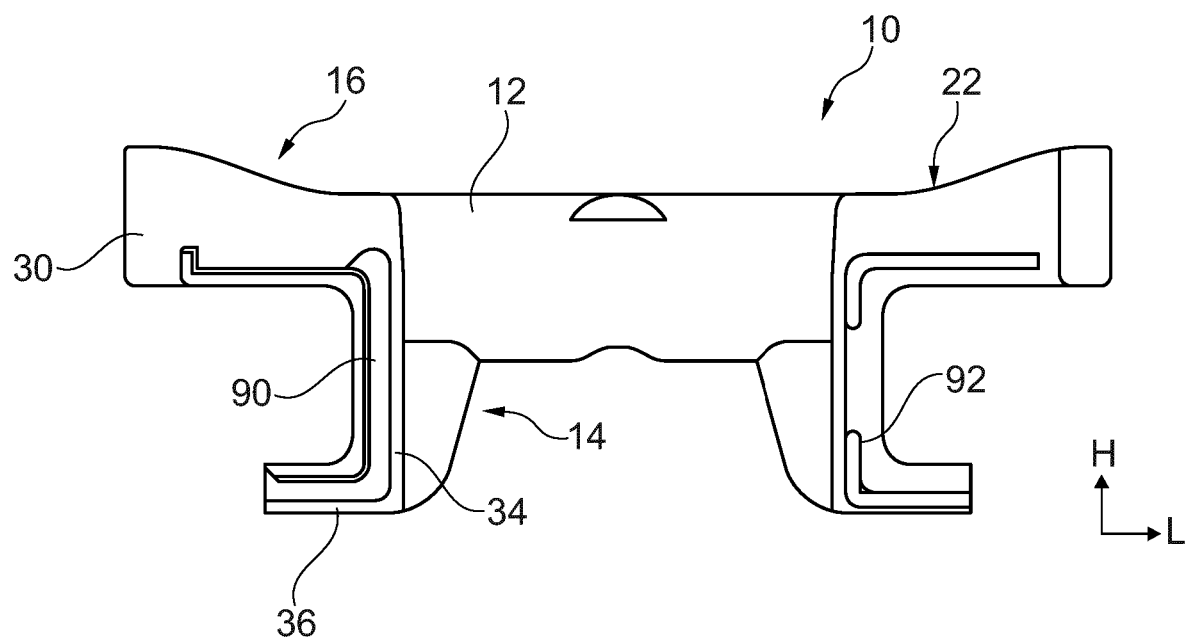
FIG. 6 is a side view of a third preferred embodiment of a grate bar according to the disclosure.

An alternative grate bar according to a third embodiment is shown in FIG. 6. According to this embodiment, the third interlocking means 70 is, on one side of the grate bar, formed by a first U-shaped lip 90 which extends over the horizontal branch 36 of the leg 14, over the vertical branch 34 of the leg 14 and over the end portion 16 of the crossbeam 12 up to the transversal end surface 30. A corresponding, second U-shaped lip 92 is arranged on the other side of the grate bar. This second U-shaped lip 92 is however slightly offset. Indeed, on the horizontal branch 36 of the leg 14 it is arranged slightly lower, on the end portion 16 of the crossbeam 12 it is arranged slightly higher and on the vertical branch 34 of the leg 14 it is arranged slightly more inwardly. Both U-shaped lips 90, 92 of two neighbouring grate bars act as abutment for each other to prevent movement of the grate bar 10 in the longitudinal direction L and the vertical height direction H.

The grate bar 10 of FIG. 6 also shows a crossbeam 12 with an essentially concave upper surface 22. Such a concave upper surface may be advantageous to prevent wear of the grate bar in pelletizing machines.

In normal operation, the second and third interlocking means 60, 70 are not in contact with each other. They only enter into contact when one of the grate bars enters into a slight misalignment. The second and third interlocking means 60, 70 then prevent the grate bar 10 form further misalignments. The third interlocking means 70, particularly the U-shaped lip 90, 92 according to the third embodiment of FIG. 6, forms a type of labyrinth seal preventing any bulk material from reaching the grate bar supports upon which the grate bars 10 rest.

The upper surface of the crossbeam may have concave or convex form to increase its resistance to wear.

In pelletizing machines, it has been found that most wear occurs to the end sections 16, 18 of the crossbeam 12. The grate bars for use in pelletizing machines are therefore advantageously provided with a convex upper surface, such as shown in FIG. 2 or 5. By increasing the amount of material on the end sections of the crossbeam, the latter are better protected against wear.

In sinter machines, on the other hand, most wear occurs to the middle section 20 of the crossbeam 12. The grate bars for use in sinter machines are therefore advantageously provided with a concave upper surface, such as shown in FIG. 6. By increasing the amount of material in the centre of the crossbeam, the middle section is better protected against wear.

The invention claimed is:

1. A grate bar for mounting in arrays of adjacent grate bars in a pallet car of a sintering or pelletizing machine, said grate bar comprising: an elongate crossbeam extending in a longitudinal direction of a horizontal plane, with a middle section between two opposite end sections,
   wherein said crossbeam has a generally rectangular cross-section with an upper surface for receiving bulk material, an opposite lower surface, and first and second peripheral surfaces for facing adjacent grate bars;
   wherein said crossbeam comprises two legs to vertically secure said grate bar to said pallet car; and
   wherein said end sections of said crossbeam, each comprises first interlocking means, said first interlocking means being shaped and arranged such that they cooperate with first interlocking means of grate bars of a neighbouring row of grate bars; thereby limiting relative translations of two neighbouring grate bars in at least a vertical orientation and a horizontal orientation,
   wherein said first interlocking means have a triangular cross-section in a horizontal plane.

2. The grate bar according to claim 1, wherein an apex of said triangular cross-section is located on a medial line between two side surfaces of the crossbeam.

3. The grate bar according to claim 1, wherein said middle section of said crossbeam comprises a spacer, the spacer being positioned and dimensioned to define, in use, a gap between neighbouring crossbeams forming a gas passage for an incoming gas flow.

4. The grate bar according to claim 3, wherein a single spacer is located in the centre of the middle section on either side of the crossbeam.

5. The grate bar according to claim 3, wherein said spacer has a shape narrowing in direction of the incoming gas flow.

6. The grate bar according to claim 1, further comprising second interlocking means, said second interlocking means comprising first and second protrusions protruding from said side surfaces of the first and second end sections of the crossbeam, said first and second protrusions being dimensioned and positioned in a staggered arrangement such that, in use, first protrusions of one grate bar cooperate with second protrusions of a neighbouring grate bar 10 to form an abutment in a longitudinal direction of the grate bar.

7. The grate bar according to claim 6, wherein said first and second protrusions have rectangular or triangular cross-section.

8. The grate bar according to claim 1, further comprising third interlocking means, said third interlocking means being arranged on each leg, each leg comprising a vertical branch essentially perpendicular to the crossbeam, and a horizontal branch essentially parallel to the crossbeam and extending outwardly in a longitudinal direction of the grate bar.

9. The grate bar according to claim 8, wherein said third interlocking means comprises an upper lip on one side of a leg and a lower lip on the other side of the leg; the upper and lower lips being dimensioned and positioned in a staggered arrangement such that, in use, an upper lip of one grate bar cooperates with a lower lip of a neighbouring grate bar to form an abutment in a vertical, height direction of the grate bar, said upper and lower lips being arranged on said horizontal branch of said leg.

10. The grate bar according to claim 8, wherein said third interlocking means comprises:
    a first U-shaped lip arranged on one side of the grate bar, said first U-shaped lip extending over the horizontal branch of the leg, over the vertical branch of the leg and over an end portion of the crossbeam; and
    a second U-shaped lip arranged on the other side of the grate bar, said second U-shaped lip having a shape corresponding to that of said first U-shaped lip but offset such that, in use, a first U-shaped lip of one grate bar cooperates with a second U-shaped lip of a neighbouring grate bar to form an abutment in a vertical, height direction and longitudinal direction of the grate bar.

11. The grate bar according to claim 1, wherein the upper surface of the crossbeam is concave or convex.

12. The grate bar according to claim 1, wherein, in said middle section, said crossbeam has cross-section narrowing down towards the lower surface.

13. The grate bar according to claim 1, further comprising a stiffening rib is arranged on the lower surface of the crossbeam.

14. The grate bar according to claim 13, wherein said stiffening rib comprises a recess in the centre of the middle section.

15. An array of grate bars comprising two or more rows of grate bars as claimed in claim 1, wherein within each row the grate bars are arranged adjacent to one another, and wherein the first interlocking means of the grate bars of one row cooperate in an interlocking manner with the first interlocking means of the grate bars of the neighbouring row.

16. A pallet car of a sintering or pelletizing machine, said pallet car comprising a grate with plurality of arrays of adjacent grate bars creating a plane surface for receiving bulk material, comprising grate bars according to claim 1.

17. The sintering or pelletizing machine comprising a pallet car equipped with an array of grate bars according to claim 15.

* * * * *